United States Patent [19]

Inuiya

[11] 4,422,097
[45] Dec. 20, 1983

[54] AUTOMATIC FOCUS CONTROLLING METHOD

[75] Inventor: Masafumi Inuiya, Asaka, Japan

[73] Assignee: Fuji Photo Film Co., Ltd., Kanagawa, Japan

[21] Appl. No.: 244,918

[22] Filed: Mar. 18, 1981

[30] Foreign Application Priority Data

Mar. 19, 1980 [JP] Japan ............................... 55-35202

[51] Int. Cl.³ ............................................... H04N 5/38
[52] U.S. Cl. ...................................... 358/227; 354/402
[58] Field of Search ................... 358/227; 354/25, 198; 352/139, 140; 355/55, 56

[56] References Cited

U.S. PATENT DOCUMENTS

| 3,211,831 | 10/1965 | Steiner | 358/227 |
| 3,621,136 | 11/1971 | Stanwood | 358/227 |
| 3,699,251 | 10/1972 | McKechnie | 358/227 |
| 3,932,733 | 1/1976 | Olsen | 358/227 |
| 3,967,056 | 6/1976 | Yata | 358/227 |
| 4,173,402 | 11/1979 | Horike | 354/198 |

FOREIGN PATENT DOCUMENTS 2615841 10/1977 Fed. Rep. of Germany ...... 358/227

Primary Examiner—Michael A. Masinick
Attorney, Agent, or Firm—Pasquale A. Razzano

[57] ABSTRACT

In a hill-climbing method for detecting a peak of a contrast signal to detect the position to bring a taking lens to for automatic focus control, the taking lens is moved further from a first detected peak position by a predetermined distance for searching for a higher peak. When no higher peak is detected, the lens is brought to the first detected peak position. When a higher level is detected, the lens is further moved for searching another peak according to the hill-climbing method.

2 Claims, 5 Drawing Figures

FRONT-FOCUS                BACK-FOCUS n: MOVING STEPS

AUTOMATIC FOCUS CONTROLLING METHOD

BACKGROUND OF THE INVENTION

1. Field of the Invention

The present invention relates to an automatic focus controlling method, and more particularly to a method of automatically controlling the focus of an image focused by a taking lens by use of a linear solid state image pick-up device in an image read-out system.

2. Description of the Prior Art

The image read-out system using a linear solid state image pick-up device is a method in which a linear solid state image pick-up device consisting of a number of linearly arranged solid state photosensors is moved from one end to the other across an image focused by a taking lens. Linear solid state image pick-up device is also called a linear sensor and consists of a number of linearly arranged CCD or a photo diode array. In this kind of image read-out system, the image focus is liable to be out while the sensor moves across the image along an image plane. Therefore, it is necessary to control the focus for every image to be read out.

In order to automatically control the focus, it is known to use a contrast signal obtained by the differential or finite difference of an image signal outputed by the linear solid state image pick-up device. The focus is controlled by moving the taking lens to a position where the contrast signal takes the maximum value. There are three methods in this automatic focus controlling system generally known as total scanning method, peak holding method and hill-climbing servo method.

The total scanning method is an automatic focus controlling method in which the taking lens is moved from a sufficiently front focus position to a sufficiently back focus position and the maximum value of the contrast signal is memorized, and the taking lens is moved back to the position where the contrast signal was the maximum.

The peak holding method is an automatic focus controlling method in which the taking lens is moved from the front focus position to the back focus position and the taking lens is stopped at the position where the contrast signal is detected to be the maximum.

The hill-climbing method is an automatic focus controlling method in which the taking lens is moved in one direction at first and the contrast signals before and after the movement of the taking lens are compared with each other, and if the contrast signal level increases the taking lens is moved further in the same direction and if the contrast signal level decreases the taking lens is moved in the opposite direction, and then when the contrast signal level is decreased after said comparison the taking lens is moved back to the position where the level is decreased.

Among the above mentioned three methods, the hill-climbing method is most popular owing to its short time required for controlling the focus and its accuracy of focus control which is better than the peak holding method. However, the actual contrast signal has several sub-peaks other than the main peak at the focusing position. Therefore, in the hillclimbing method, sometimes one of the sub-peaks is detected before the main peak is detected and the taking lens is stopped at the sub-peak position.

SUMMARY OF THE INVENTION

The primary object of the present invention is, therefore, to provide an automatic focus controlling method which is capable of detecting the main peak of the contrast signal more certainly than the hill-climbing method.

A more specific object of the present invention is to provide an automatic focus controlling method which is capable of automatically moving the taking lens to the most focusing position corresponding to the main peak of the contrast signal even when there are several sub-peaks around the main peak in the contrast signal.

The automatic focus controlling method in accordance with the present invention is a modified hill-climbing method in which the taking lens is moved in one direction, and when the contrast signal detected changes from increasing mode to decreasing mode the taking lens is not stopped but is further moved to search for a higher peak with a predetermined distance range from the position where the contrast signal changed its mode. In case that a higher peak is not detected within that range, the taking lens is moved back to said position of the peak. In case that a higher peak is detected, the taking lens is moved to the position of the higher peak. Thus, in the present invention, the taking lens is moved over the range in which the peak is detected in the conventional hill-climbing method and a higher peak is searched for in the larger range.

Since the sub-peaks are usually located within a distance from the main peak or the real focusing position, the main peak can be found out by searching in a predetermined range around one peak detected at first. If no higher peak is found within that range, the peak first found must be the main peak. If a higher peak is found within said range and no higher peak is found throughout that range, the higher peak thus found must be the main peak. Thus, it is possible to detect the real peak or the maximum level of the contrast signal.

DESCRIPTION OF PREFERRED EMBODIMENTS

Figure 1:
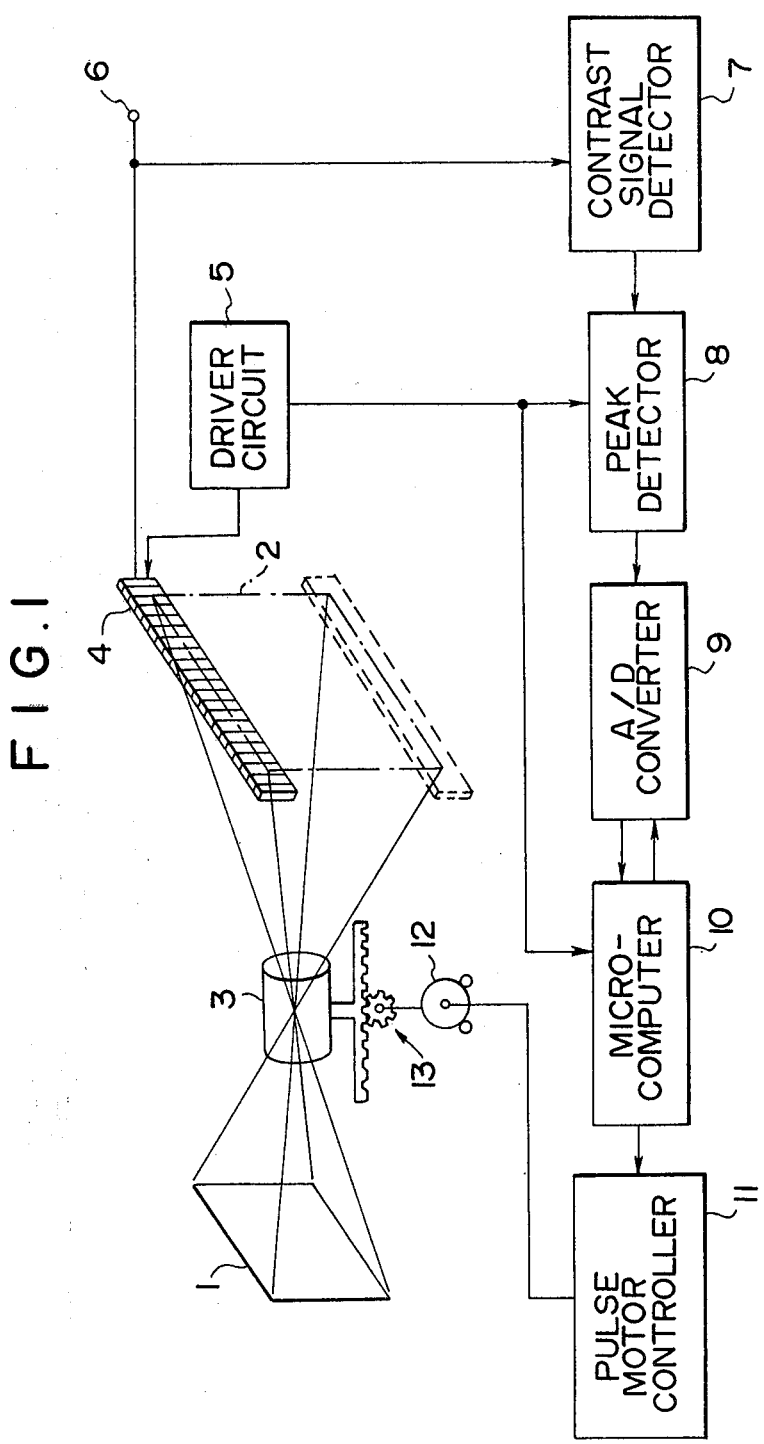
FIG. 1 is a schematic view including a block diagram showing an image read-out device for carrying out the automatic focus controlling method in accordance with an embodiment of the present invention.

Now the present invention will be described in detail with reference to FIG. 1 which shows an image read-out device for carrying out the automatic focus control according to the present invention.

An image of an object 1 is focused into an image by a focusing lens 3. On the image plane of the image 2 is provided a linear solid state image pick-up device 4 for reading out the image 2 while moving in one direction from one end to the other of the image 2. The read-out start position is indicated by solid lines and the read-out end position is indicated by broken lines.

The image pick-up device 4 is connected with a driver circuit 5 to be driven thereby and reads out the image 2 and generates an image signal in synchronization with pixell (picture cell) clock pulses. The image signal is outputed from an output terminal 6 of the image pick-up device 4. On the other hand, the image signal is also given to a contrast signal detector 7 to be used for focus control. The contrast signal detector 7 is a circuit which obtains from an image signal a contrast signal which changes its level according to the sharpness or focusing condition of the image. The contrast signal detector 7 outputs a contrast signal for every picture cell or pixell of the image pick-up device 4. The contrast signal is inputed into a peak detector 8 which detects the maximum level of the output of the image pick-up device 4 and holds the maximum level or peak in one scanning step. The level of the peak thus obtained is converted to a digital value by an A/D converter 9, which in turn is inputed into a microcomputer 10 by way of an input-output interface (not shown). The microcomputer 10 compares the contrast signal thus input thereinto with another contrast signal input thereinto by a previous step and provides a pulse motor control signal for moving the taking lens in the direction to the higher peak to finally move the lens to the highest peak. The pulse motor control signal is inputed into a pulse motor controller 11 by way of an input-output interface (not shown), whereby the pulse motor 12 is rotated in the determined direction by a determined amount controlled by the control signal. By the rotation of the pulse motor 12, the focusing lens 3 is axially moved for focusing the image 2 by way of a rack and pinion mechanism 13 for instance.

Figure 2:
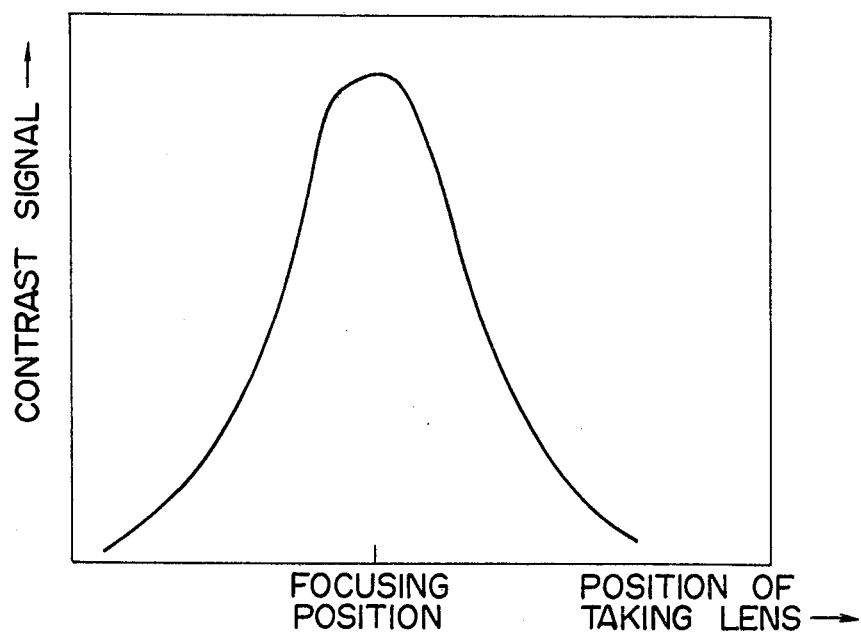
FIG. 2 is a graph showing an example of an ideal curve of the contrast signal with respect to the position of the taking lens.
Figure 3:
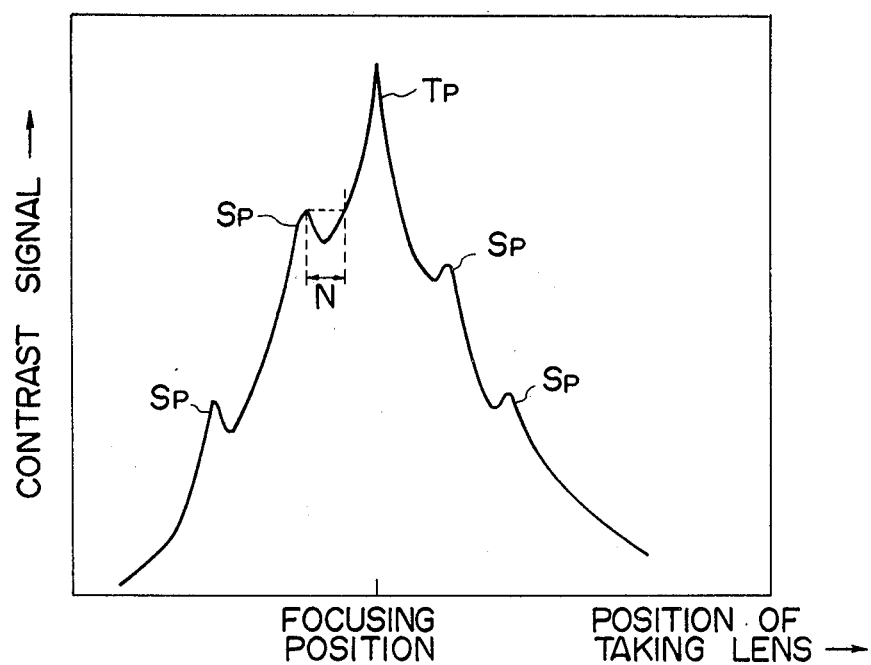
FIG. 3 is a graph showing an example of an actual curve of the contrast signal with respect to the position of the taking lens.

When conducting the focusing by the hill-climbing method, the focus can easily be detected in case that the curve showing the relationship of the level of the contrast signal and the position of the taking lens is of ideal form having a single peak Tp (true peak) as shown in FIG. 2. Actually, however, the curve has a number of sub-peaks Sp other than the true peak Tp as shown in FIG. 3. Therefore, in the detection of the peak by the hill-climbing method, one of the sub-peaks is falsely detected as the true peak sometimes.

In the present invention, therefore, even when a peak has been detected, a higher peak is searched for over a range further from the position of the first detected peak. Only when no higher peak is detected, the first detected peak is regarded as the true peak and the lens is moved to the position of the peak detected. Said range is predetermined to be larger than the width N of the valley between the true peak Tp and the adjacent sub-peak Sp as shown in FIG. 3. The width of the valley N thus determined should not be smaller than the width of any other valley. By predetermining the width N or range of further search for a higher peak, it is possible to always detect the highest peak. Therefore, there is no fear of setting the lens at a sub-peak.

Figure 4:
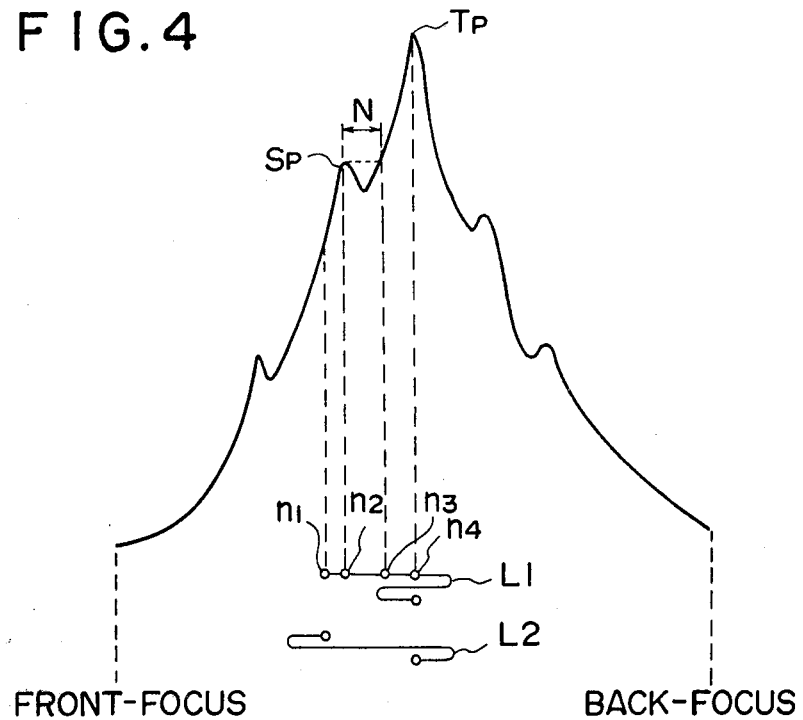
FIG. 4 is a graphical representation showing an example of the trace of movement of the taking lens illustrated in relation with the curve of a contrast signal.

The steps of detecting the highest peak will be described in further detail hereinbelow referring to FIGS. 4 and 5. Now assuming that the taking lens is at the position of n1 a little on the front focus side from the true peak Tp and the contrast signal at this state is A, and the lens is moved in the direction to the back focus, the lens is first moved by one step and the contrast signal is measured. The contrast signal B thus measured has a higher level than the contrast signal A. The level of the contrast signal increases as the lens moves backward up to the position n2 of a sub-peak Sb. As the lens moves further, the level then decreases, which indicates that a peak has been detected. In this case, the lens is further moved backward by the distance of said N to search for another peak having a higher level. While the lens is moved further by the distance N, a higher level is detected at a position n3 where the lens has moved over a valley adjacent the sub-peak Sp on the true peak side. Therefore, the detection for the higher peak is not finished until the true peak Tp is detected. When the true peak Tp has been detected, the lens is further moved backward for a higher peak by the distance N. Since there is no higher peak in the range of the further search over the position n4 of the true peak Tp, the lens is then moved in the reverse direction to the front. Then, the lens is moved over the true peak Tp. When the lens passes this peak Tp, the peak is again detected. However, in this stage, the lens is further moved to the front until it comes to the end of a further range having a width of N. Then, since no higher peak is detected in that range, the lens is returned again backward. Then, the lens is settled at the position n4 which has the highest level in said ranges of detection.

Thus, the lens is moved in one direction at first, and then moved in the opposite direction, and finally moved in the first direction up to the position of the detected peak. The trace of the movement of the lens is indicated by L1 in FIG. 4.

Now, another case in which the lens is first moved forward will be described in detail. The movement of the lens is shown at line L2 in FIG. 4. At first, when the lens is moved one step, the level of the contrast signal becomes low as it moves. Then, the lens is further moved to the front by the distance N to confirm that the level does not rise. Having confirmed the non-rise of the level, the lens is moved in the opposite direction backward. In the backward movement, the lens is moved through the positions n1,n2,n3 and n4 and further by the distance N from the position n4. n3 is the position at a distance N backward from the sub-peak position n2 where the level of the contrast signal is a little higher than the level of the sub-peak and it is decided to move the lens further backward. After the lens has come to the turning point at a distance N from the position n4, the lens is returned to the front. However, in this case, since the return of the lens is the second return, the lens is stopped at the position n4 of the true peak differently from the above case shown at line L1. The lens is moved to search for the peak and the direction of the movement is reversed twice. After the second turn of the lens, the lens is stopped at the position of the highest peak detected so far. Thus, the lens is brought to the true peak and the focus is automatically controlled.

Figure 5:
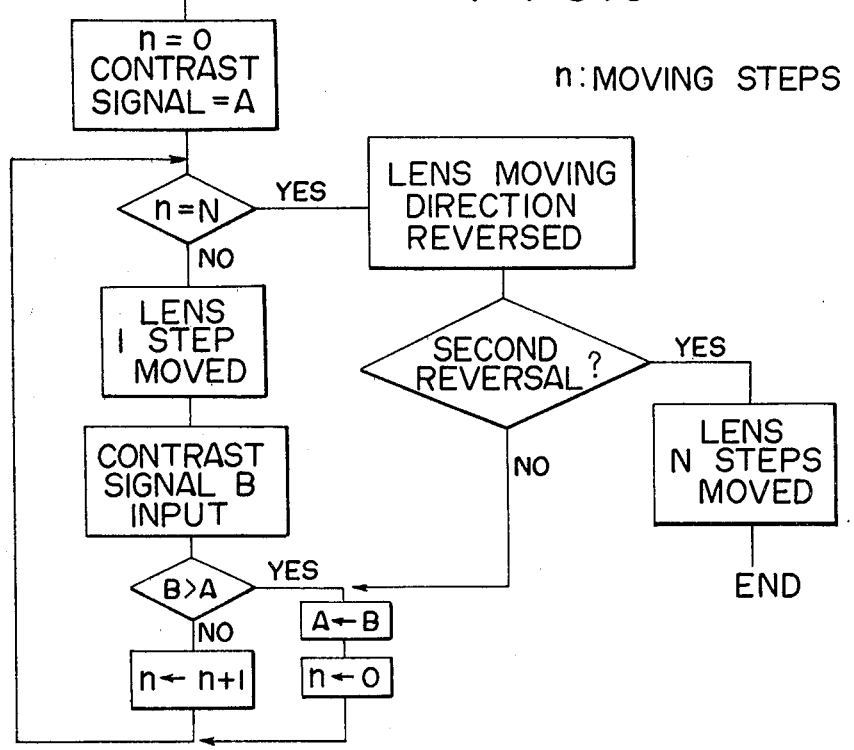
FIG. 5 is a flow chart for explaining the method of automatic focus control in accordance with the present invention.

The above mentioned steps to control the focus are shown by a flow chart in FIG. 5 which will readily be understood by those skilled in the art.

Further, in case that the position of the taking lens is far apart from the focusing position or the true peak initially, the contrast signal first obtained has a very low level and cannot be distinguished from the noise. Therefore, it is desirable to first compare the contrast signal with a predetermined threshold level (2-3 times as high as the noise level) at the beginning and, when the level of the contrast signal is lower than the threshold level, move the taking lens to a home position (the frontmost or rearmost position) and then move the lens step by step up to a position where the level of the contrast signal becomes higher than the threshold level, and start the hill-climbing method from this position.

Further, in some cases, the level of the contrast signal does not become higher than the threshold level because of the pattern of the image scanned by the image pick-up device. In such a case, the start position of the image pick-up device may be changed by one or two steps inside the image so that a different part of the image may be received by the image pick-up device.

I claim:

1. An automatic focus controlling method for a system including a lens comprising the steps of moving the lens axially in a first direction, generating a contrast signal from an image pick-up device scanning an image focused by the lens, comparing the maximum/peak contrast signal generated with a previously generated and stored maximum/peak contrast signal, moving said lens in said first direction by a predetermined distance beyond a position at which a maximum/peak contrast signal is generated while continuing to generate the contrast signal to search for another peak, said predetermined distance being established as a distance long enough to encompass lens movement corresponding to a lower contrast signal following an immediately preceding peak- signal, and moving said lens in a second opposite direction if a greater peak signal is not generated in said predetermined distance to a position corresponding to the last maximum/peak signal.

2. The method as defined in claim 1 wherein said previously generated and stored maximum/peak contrast signal comprises initially a predetermined threshold signal and said first mentioned moving step comprises the step of moving the lens toward a position where the level of the generated contrast signal is higher than said threshold signal when the initially generated contrast signal is lower than the threshold signal.

* * * * *